Jan. 22, 1957   J. HERTRICH   2,778,501
CENTRIFUGAL BASKET STRIP LININGS
Filed Dec. 6, 1949   4 Sheets-Sheet 1
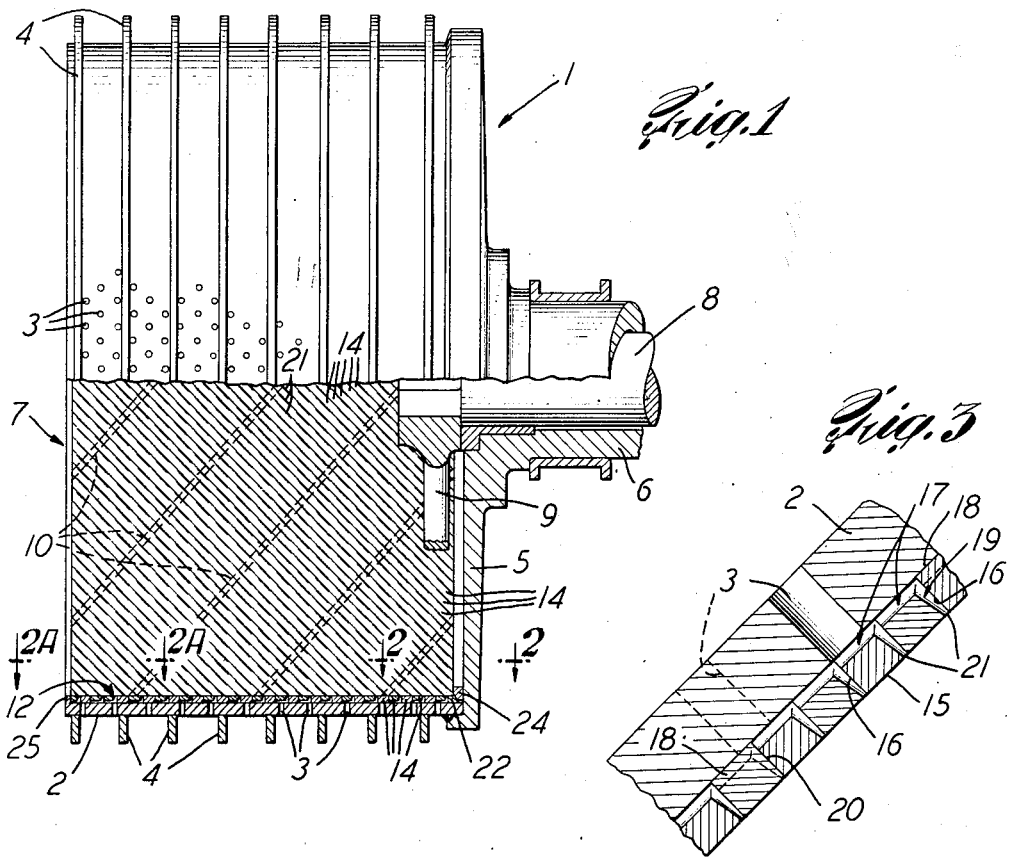
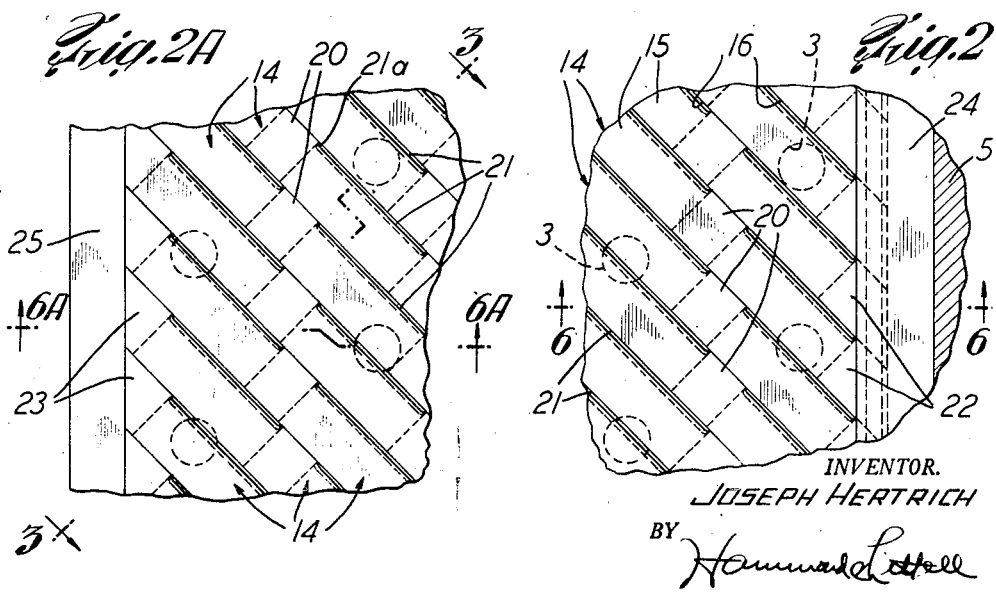
INVENTOR.
JOSEPH HERTRICH
BY
ATTORNEYS

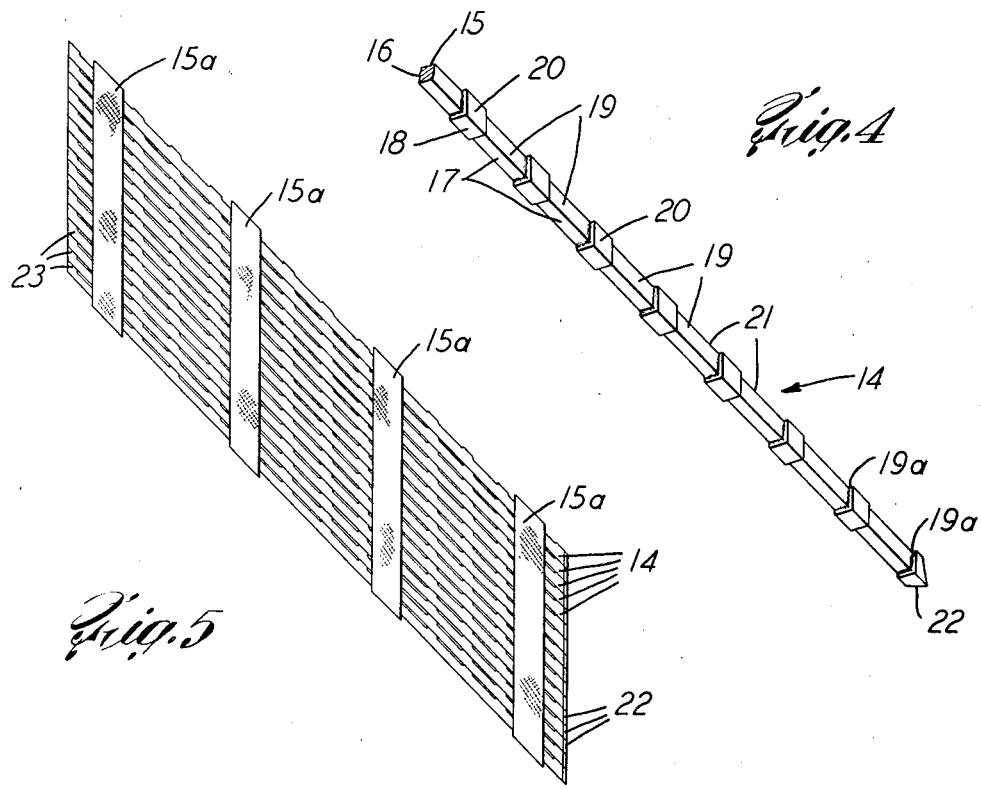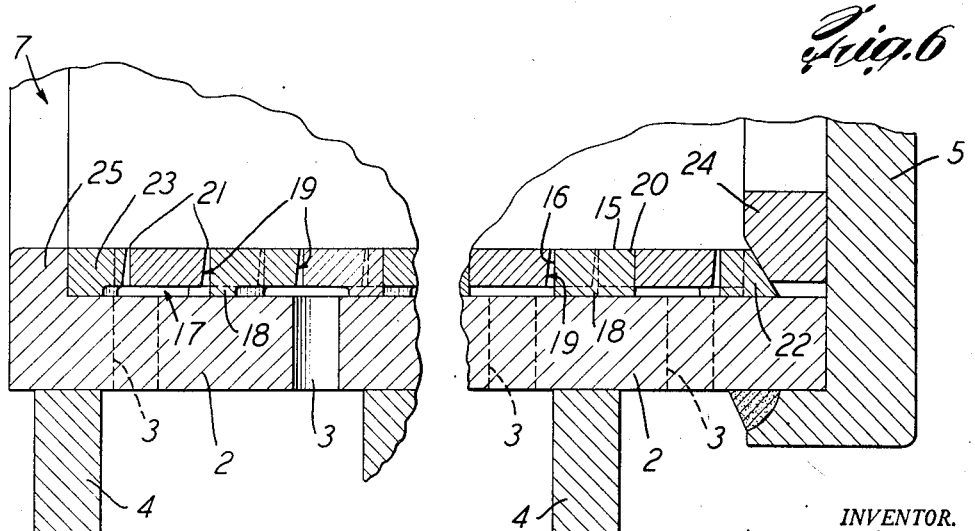

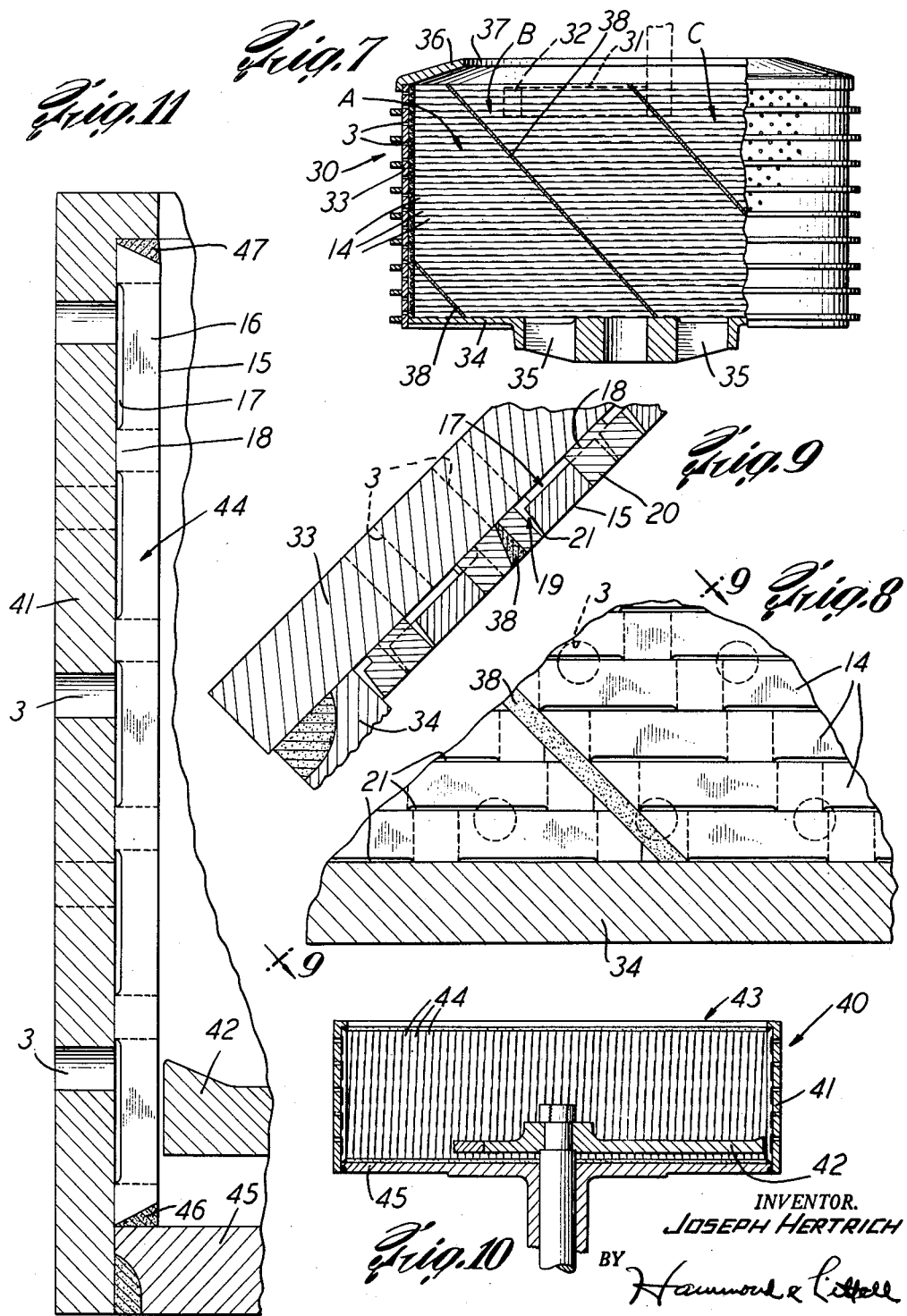

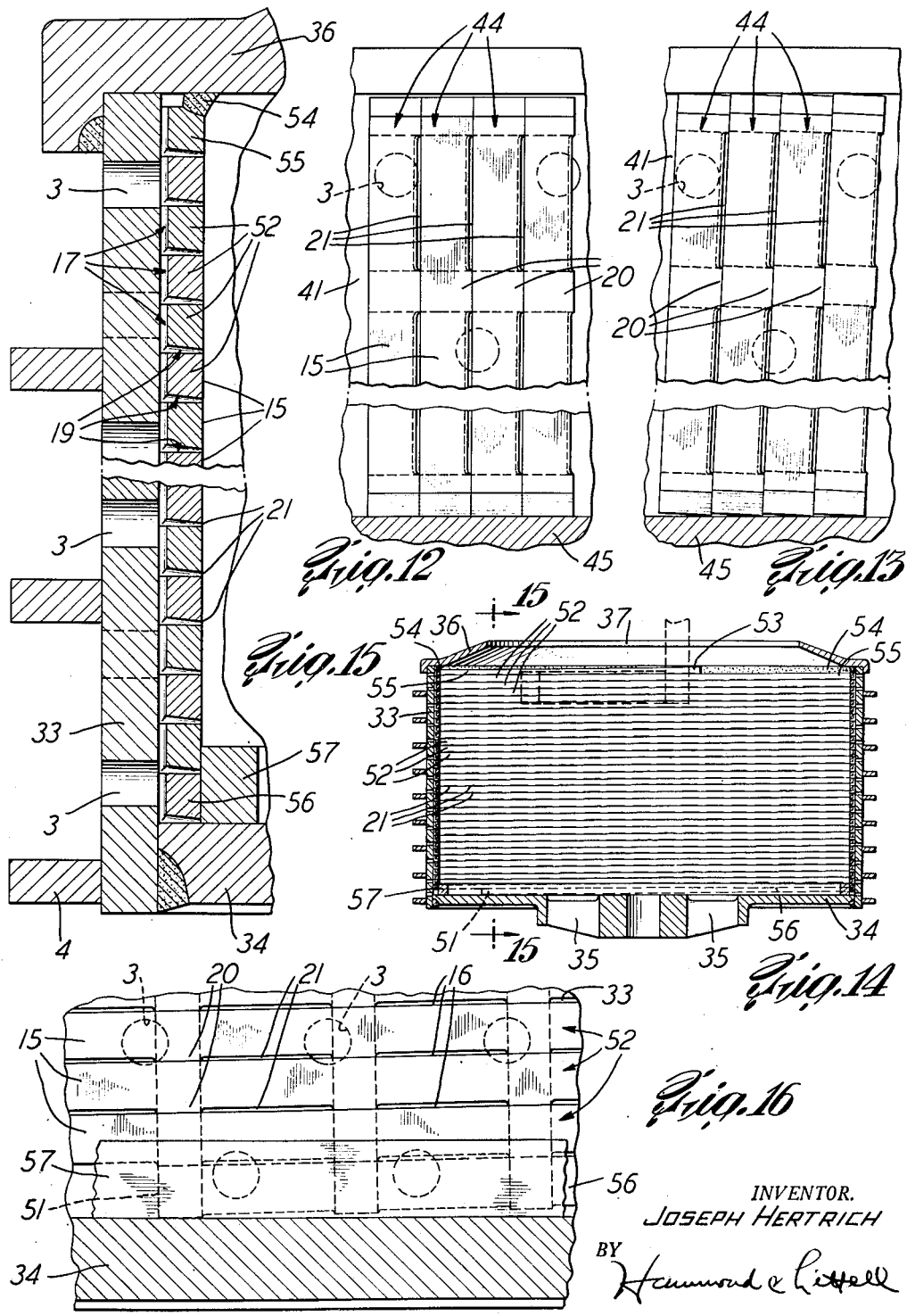

ered by the device discharging the treated solids. A further object is to provide baskets for continuous centrifugal machines which comprise lining

United States Patent Office 2,778,501
Patented Jan. 22, 1957

2,778,501

CENTRIFUGAL BASKET STRIP LININGS

Joseph Hertrich, Hamilton, Ohio, assignor to The Western States Machine Company, Hamilton, Ohio, a corporation of Utah Application December 6, 1949, Serial No. 131,476

14 Claims. (Cl. 210—76)

This invention relates to the art of lining or screening baskets for centrifugal machines of the filtration or perforated basket type, such as are used to separate liquids from bulky charges of finely divided solids by centrifugal force.

Perforated centrifugal baskets as now used are lined with one or more layers of suitable foraminous sheet materials which usually include a fine woven wire screen at the inside to retain the charge solids. The usual linings are easily worn or damaged, often even ripped out, by the action of mechanical discharging devices used for removing the treated solids. This problem is especially troublesome where the treated solids form a hard wall in the basket, as in the centrifuging of fine grained sugar, dextrose, or the like.

Basket lining renewal thus is a costly phase of centrifugal operations, and there are several other problems: The practice of overlapping the meeting edges of lining sheets both impairs their filtering efficiency and tends to unbalance the centrifugal basket. The finest screens used present filtration openings large enough to catch or pass fine charge solids, which easily become clogged by the solids. When used in high speed centrifugals the usual basket linings are also likely to lose filtering efficiency by being distorted or flattened under extreme pressure from the spinning charge.

Problems of the kind mentioned are accentuated in the use of continuous filtration centrifugals, for the basket lining in a continuously spinning machine not only must filter off liquid and retain solids but also must permit the solids to be moved efficiently over its inner surface to an outlet while spinning under high centrifugal force. The usefulness and practical efficiency of such continuous centrifugals have been limited to a considerable extent by limitations of available basket linings.

The general object of this invention is to overcome problems and limitations above mentioned.

A more particular object is to provide foraminous linings for perforated centrifugal baskets which give high filtering efficiency and yet form durable, almost permanent parts of baskets that can yield under stress with the basket shells but cannot be ripped or torn out by the solids discharging devices used in them.

Another object is to provide such linings and elements or groups of elements to be assembled in making them, which a skilled workman can assemble and which are naturally assembled with a uniform construction and a uniform filtering capacity over their whole area.

Another object is to provide basket linings and elements for making them in which filtration openings of almost any desired size and shape may be formed.

A special object of the invention is to provide efficient basket linings formed with a myriad of filtration openings in the shape of very narrow slits that have relatively little tendency to catch or become clogged by fine charge solids; and a further object is to provide baskets for continuous centrifugal machines which comprise lining elements and filtration slits that extend smoothly in the direction of discharging action so that there can be little resistance by the basket lining to the forced movements of spinning charge solids.

Still another object is to provide efficient foraminous basket linings which can be made satisfactorily of any desired structural material in order to meet special service requirements in chemical or other industries.

According to this invention a centrifugal basket comprising a strong perforated annular shell of any suitable or usual construction is lined internally with a very large number of lengths of a preformed narrow strip material, the many lengths being arranged and held against the shell in side by side abutment as a substantially rigid annular body, and a myriad of filtration passages is provided through this body at intervals along and between adjacent sides of the many strip lengths. The strip lengths are laid in the general direction of action of whatever solids discharging device is to be operated over their inner face; i. e., they preferably extend either parallel or nearly parallel to the direction of the displacement or discharging of solids in the basket by the scraper or scrapers of the discharging device in the course of the relative movement between the basket and the scraper that effects this displacement. Accordingly, the side edges of the many strip lengths, even though not perfectly aligned, obstruct relative movements between the basket lining and the discharging device, and solids spinning in the basket, if it be adapted for a continuous centrifugal machine, can be moved readily along the strips to a basket outlet without being caught or fractured by the strip edges.

The direction of the strips in the assembled structure generally is at an angle to the axis of the centrifugal basket. The angle in any particular embodiment will depend upon the use for which the basket is intended and the manner of assembly selected.

The strip material here used is preferably of an approximately square or rectangular cross section and is formed so that each of the abutting lengths will present an even front face to align itself with the similar faces of adjacent elements in the assembled structure. The many lengths together thus form a smooth lining surface which is uniform over the whole filtering area of the basket and is interrupted uniformly by the regularly spaced filtration passages. Those passages preferably are very narrow slits which can be of any desired width and can be formed easily by making the strip material with an even surface along one side and with suitably shallow and relatively wide transverse depressions or grooves at regular intervals along the opposite side. The side grooves become filtration slits in the assembled lining and are separated therein by projections which bear against the even side of an abutting strip length to give rigidity to the lining body.

The back of the strip material also is preferably formed with relatively wide but shallow transverse depressions or grooves at regular intervals, and the projections which separate these bear against the inside of the basket shell to sustain the radial pressure exerted on the lining body. The back grooves form channels between the lining slits and the basket perforations, through which liquid filtered through the slits can flow freely to the perforations.

In general the strip material here used is large enough in cross section to form a lining body sufficiently thick and rigid to give long service, yet it is so small that any length used can be bent or shaped easily to fit any curved path on the basket shell which it may be destined to follow. The open filtration area provided by the assembled strip material per unit of basket wall area depends upon the width of the material, which determines the number of lengths needed to cover a certain wall area, and the size and frequency of the filtration passages formed along the material. These factors can be varied so as to meet the needs of different kinds of solids to be processed in the centrifugal machines.

According to some embodiments of this invention, the new strip lining may be assembled in a cylindrical basket by preforming the strip material into individual lengths adapted to extend helically between ends of the basket shell and simply laying and holding these lengths or suitable groups of them side by side against the inside of the shell, first at a smaller inclination to its axis than they finally are to assume, until the last strip enters readily in place to complete a ring, and then shifting all the strips diagonally until their sides press tightly together to form a substantially rigid annular body. As so assembled the ends of the strips are fixed in place by suitable binding means, such as a binding ring wedging ends of all the strips, if a dismountable assembly is desired, or an annular weld joining the strip ends integrally with the basket. An arrangement of this sort is especially suitable for a continuous centrifugal employing differentially rotated helical feed arms inside the basket as disclosed in my copending application, Serial No. 77,578, filed February 21, 1949, now Patent No. 2,727,629, December 20, 1955, the strips being arranged to extend approximately at right angles to the helical arms, i. e., in the direction of their solids discharging action.

According to another embodiment of the invention, which is adapted for a cyclical centrifugal basket emptied periodically by a discharger shoe, the strip material may be shaped into similar lengths fitting a circular arc of the basket shell, and these may be laid horizontally against the shell in side by side arrangement as several groups bridging the length of the shell and collectively encircling its inner surface. The ends of the strips of the respective groups may be stepped diagonally to lie in helical lines between ends of the shell and may be fixed to the shell along these lines by welds or other suitable binding means. When such a basket rotates treated solids against a discharger shoe the shoe tip will scrape the lining in the direction of the strips, and the helical bindings between the groups of strips keep the strip ends from obstructing the action of the shoe.

According to a third embodiment of the invention, a lining of the type described can be made of many similar strip lengths extending nearly parallel to the axis of the basket, this arrangement being particularly suitable for a continuous centrifugal in which a reciprocatory pusher thrusts the charge solids intermittently toward an open end of the basket. Straight lengths of the strip material which bridge the perforated area of the basket shell can be used for this purpose. They are simply laid side by side against the inside of the shell until no further strips can be inserted and then are shifted angularly as far as possible in order to constrain all the strips tightly together, whereupon the free ends are fixed in place by a binding ring, an annular weld, or the like. In a preferred assembly of this kind each strip may extend in a slightly helical path at an angle of not more than about 4 degrees to the basket axis.

According to a fourth embodiment of the invention, a strip lining of the kind disclosed can be built up from a continuous band of the pre-formed strip material by simply fixing one end of the material to the inside of the basket shell at an end of the latter and feeding in the material while turning the basket until a complete lining body has been formed of many abutting helical windings bearing against the shell. Then the trailing end of the material may be fixed to the shell and bindings may be applied to hold the end convolutions of the lining body in place. In such an arrangement the respective windings serve as abutting parallel strip lengths, although they have no finite longest dimension. An embodiment of this sort is especially advantageous for conventional centrifugal baskets used with discharger shoes.

The present invention will be further understood from the following detailed description and the accompanying drawings of illustrative embodiments.

In the drawings:

Fig. 1 is a side elevation, partly in vertical cross section, of a continuous centrifugal basket lined according to one embodiment of this invention;

Fig. 2 is an enlarged fragmentary view taken on line 2—2 of Fig. 1, showing part of the lining body in elevation at the back or closed end of the basket;

Fig. 2A is a similar view from line 2A—2A of Fig. 1, showing part of the lining body at the front or open end of the basket;

Fig. 3 is a fragmentary cross section transverse to the lining strips, taken on line 3—3 of Fig. 2A;

Fig. 4 is a perspective view of part of a single strip length;

Fig. 5 is a schematic front elevation of a bundle or group of similar strip lengths held together for convenient assembly in a basket shell like that of Fig. 1 or Fig. 7;

Fig. 6 is a fragmentary cross section through the back end of the basket wall structure of Fig. 1, taken on line 6—6 of Fig. 2;

Fig. 6A is a fragmentary cross section through the front end of the same basket structure, taken on line 6A—6A of Fig. 2A;

Fig. 7 is a schematic view, partly in elevation and partly in vertical cross section, of another basket assembly embodying the invention;

Fig. 8 is an enlarged front elevation of part of the lining of Fig. 7 as seen at the basket bottom which appears in section;

Fig. 9 is a cross section through the structure of Fig. 8, taken on line 9—9 of the latter;

Fig. 10 is a vertical cross section through a continuous centrifugal basket assembly fitted with a strip lining according to a third embodiment of the invention;

Fig. 11 is an enlarged cross section through part of the basket wall structure of Fig. 10, taken along the even side of one lining strip;

Figs. 12 and 13 are schematic views, partly broken away, indicating original and final positions, respectively, of the lining strips as employed in the third embodiment;

Fig. 14 is a vertical cross section through a strip lining assembled according to a fourth embodiment of the invention;

Fig. 15 is an enlarged vertical cross section through part of the basket wall structure of Fig. 14; and Fig. 16 is an enlarged fragmentary front elevation of lining elements at the bottom of the basket of Fig. 14, the basket bottom appearing in section.

Referring first to the embodiment of Fig. 1, a centrifugal basket 1 is there shown which comprises a strong cylindrical shell 2 formed with perforations 3 of any suitable type and strengthened by external rings 4. The shell 2 has a closed end or bottom wall 5 carried on supporting shaft 6 by which the basket is to be rotated continuously at a high speed. Its other end 7 is open so that solids in it may be discharged by differential rotation of a helical feed member which appears only in diagram. For present purposes it suffices to mention that the feed member has a shaft 8 and a wheel 9 carrying inside the basket a plurality of helical arms indicated schematically by broken lines at 10 in Fig. 1. These arms extend helically along the face of the basket lining 12 between the ends of shell 2, and they are designed to be rotated continuously by shaft 8 at a speed different from the basket speed so that solids engaged by the leading sides of the arms will be moved toward outlet 7 in directions at right angles to the arms.

The filtration lining 12 is composed essentially of a very large number of similar individual lengths 14 of a suitably preformed narrow strip material. A part of one length is seen in Fig. 4, and a group of several lengths held together by removable tapes 15a for ease of assembly is seen in Fig. 5. In the embodiment of Fig. 1 the strips are to extend over the inside of shell 2 from end to end thereof in a direction transverse to the helical feed arms 10, i. e., in the direction of discharging movement of solids in the basket; and this determines the strip length for any particular size basket. The transverse dimensions of the strips depend upon the filtration and wearing properties desired. In sugar centrifugal work the strips may be made, for example, of rectangular or square steel bar stock about ⅛" to ¼" in breadth and thickness. They may be either pre-shaped to their final helical form or bent to that form when assembled in the basket.

As seen particularly in Figs. 2 to 4, the strip material forming each element 14 is made with an even front 15, with one even side 16, and with the back and the other side presenting many wide and shallow transverse grooves 17 and 19, respectively, separated by intervening projections 18 and 20, respectively. The back and side grooves 17 and 19 may be formed by simply cutting away or depressing parts of two meeting surfaces of suitable bar stock so as to leave uncut portions projecting at 18 and 20 between the grooved areas. The side grooves preferably are tapered from a minimum depth at 21 where they intersect the front surface 15. Accordingly, when the grooved side of one length of the strip material is laid against the even side of another length the resulting structure contains very narrow filtration slits at 21 in a surface otherwise substantially smooth.

A complete annular lining 12 formed of strips 14 may be assembled as follows: Referring to Fig. 1, binding ring 25 is fixed around the open end of shell 2, and groups of the strips are laid and held side by side against the inside of the shell so as to extend helically thereover with end 23 of each strip bearing on ring 25. The back projections 18 of each strip are placed against the shell, and the grooved side thereof, i. e., its projections 20, bear against the even side of an adjacent strip. The strips are inserted in this way until the shell is so completely covered that no further strip can be inserted. Then the whole ring of strips is shifted angularly as far as possible to constrain all the strips against the shell in close side by side abutment. A binding ring 24 then may wedged against tapered ends 22 on all the strips to hold the strips permanently, though dismountably, as a substantially rigid body.

The face of this body is formed by the aligned even fronts 15 of the many narrow strips, and since any projecting side edges of individual strips extend in the direction of charge movement they cannot obstruct the action of the helical feed arms 10 or impose resistance to the progress of solids through the basket. A myriad of very narrow filtration slits 21 exist in the lining body, and these also extend in the direction of charge movement. The side grooves preferably are formed with curved sides 19a (Fig. 4) so that the slits will have rounded ends at 21a to facilitate movement of solids over the lining.

In the case of a lining adapted for sugar processing, for example, the strip material may be made about 3/16" square at the projections and the slits at 21 may be made about .010" wide, which is considerably narrower than the openings of the finest woven wire screens used in sugar centrifugal work. It will be understood that any desired slit width can be obtained. The length of the slits is limited only by the number of projections 20 needed to keep the lining sufficiently rigid under working stresses.

It also will be evident that liquid filtered through the slits 21 is able to flow freely to the inside of shell 2 and then through the channels formed by back grooves 17 over the inner surface of the shell to its outlet perforations. The back grooves provide channelways over most of the shell area, these being interrupted by projections 18 only to the extent needed in order to sustain radial loads on the lining.

The described strip lining construction gives important advantages in its filtration properties, in being resistant to the action of a solids discharging device, in enabling easy movement of solids through the basket with little tendency to fracture the moving solids, and in that it forms an extraordinarily durable, almost permanent basket lining which nevertheless can be assembled or dismantled by skilled labor. Although it is heavy enough to resist wear indefinitely, it possesses a degree of flexibility enabling it to expand or contract with the basket shell under the heavy stresses applied in high speed centrifugal work.

Figs. 7, 8 and 9, illustrate another way of assembling strip elements of the type shown in Figs. 4 and 5 into an improved basket lining. The basket 30 is of the kind commonly used for suspended cyclical centrifugals. Its cylindrical perforated shell 33 extends vertically between a bottom wall 34 having solids outlets at 35 and a cap 36 formed with central opening 37, and it is to be discharged at the end of each operating cycle by slow rotation to thrust charge solids against a relatively stationary discharger shoe diagrammed at 31. The tip 32 of the discharger shoe may scrape the rotating basket lining in this operation; so it is desirable that the lining strips 14 extend circularly about the interior of the perforated shell.

Accordingly, the strips 14 in this embodiment are shaped to lie horizontally in a circular arc over shell 33 and are laid side by side against the inside of the shell in several groups or tiers A, B, C, etc., each group covering a part of the shell area between wall 34 and cap 36. The aligned individual strips of the several groups cover substantially the entire inner circumference of the shell, leaving only enough space between their ends to permit easy assembly. As shown, the many side-by-side elements of each group are offset from each other in a stepped arrangement so that their ends define a helical line extending between the ends of the basket; and the assembly is fixed in place by welding together the ends of the many strips of the adjacent groups along the helical lines at 38.

The third embodiment of Figs. 10 to 13, inclusive, makes use of a strip lining material like that employed in the other embodiments, and individual lengths 44 of such material are assembled inside the basket shell 41 in much the same manner as has been described in connection with Fig. 1. In this embodiment, however, the basket assembly is one adapted to be rotated continuously and to be discharged by reciprocation of a pusher member 42 which thrusts solids in the rotating basket intermittently along its axis toward an open end at 43. The lining strips 44 therefore are arranged to extend nearly parallel to the axis of the assembly. For this purpose they may be formed as straight lengths of the strip material long enough to bridge the axial length of the perforated area of shell 41.

In assembling the lining body, a very large number of strips 44 may be stood endwise on the basket end wall 45 and laid against the inside of shell 41 in side by side relation until a ring of strips has been formed which will not receive another strip. The arrangement then existing is indicated by Fig. 12. Then all the strips are shifted angularly to form a tightly constricted annular body in which the strips have a helical bent at a small angle to the axis of the basket, as indicated in Fig. 13. The ends of the strips are fixed in this shifted position by welds 46 and 47 or other suitable binding means at the opposite ends of shell 41 (Fig. 11).

Assuming, for example, that shell 41 has a diameter of forty inches (40") and is to be lined with strips 3/16" square in cross section (at the projections), it is determinable by calculation that six hundred and sixty-three (663) strips are needed to complete the lining body; that these in Fig. 12 position would leave an unfilled space about .11 inch wide; and that shifting them to an angle of about two degrees and twenty-three minutes (2°23') to the basket axis, as in Fig. 13, would completely close that space. Allowing for manufacturing tolerances the angle still would not exceed four degrees (4°).

The fourth embodiment of Figs. 14 and 16 illustrates a simple and highly practical way of applying the invention to any annular centrifugal basket and is particularly suitable for an assembly in which the solids-discharging device acts circumferentially. The basket shown is of the conventional suspended type formed and discharged as described in connection with Fig. 7. The strip lining material used may have the same general form as the material described in connection with the other embodiments, but instead of being cut into individual lengths to be assembled as such or in groups, it is provided and assembled as a continuous strip of the material.

To line the basket shell 33, a free end 51 of the strip material first may be laid and fastened against the inside of the shell at the bottom wall 34 as seen in Fig. 14, with the grooved back of the material bearing against the shell. Then the strip material may be simply fed into the shell while turning the basket so as to form a cylindrical body of abutting helical strip windings 52. The feeding in of the material is continued until these windings have reached the top of the shell, at point 53 just beneath the basket cap 36. Then the strip material is severed, if necessary, and the trailing end at 53 is welded or otherwise fixed to the basket structure. A weld line 54 or other binding may be applied around the uppermost winding 55 to secure it in place, and the lowermost winding 56 may be fixed by a similar weld line or by a binding ring 57 pressed against its face and the basket bottom as shown.

The many strip windings 52 in Figs. 14 to 16 correspond in relationship and function to the many individual strip lengths of other embodiments described. The windings bear against each other and the basket shell so as to form a substantially rigid cylindrical lining of great durability which is entirely free of joints over the area of action of the discharger shoe tip 32, which can yield readily to expand with the supporting shell, which presents a smooth surface in the discharging direction, and which serves as an efficient filtering medium by reason of the myriad of filtration slits 21 provided between and along the abutting lengths of the strip material.

It will be understood that the strip lengths and slits present in basket linings made according to this invention generally will be far more numerous than may appear from the drawings. An assembly as shown in Fig. 14, for example, may contain about five or more abutting strip lengths for every inch of radial length of the perforated basket shell.

The illustrative embodiments here shown and described fully achieve the declared objects of this invention. It will be evident that the new features and principles of construction disclosed and used in them may be applied for like effects in various other ways and by use of various forms and kinds of strip material within the scope of the appended claims.

I claim:

1. In a centrifugal basket comprising a perforated cylindrical basket shell, a cylindrical filtration lining over the inside of said shell formed of a multiplicity of similar individual lengths of narrow strip material confined in side by side abutment and each extending helically from one to the other end of the shell.

2. In a centrifugal basket comprising a perforated cylindrical basket shell and adapted to be discharged by differential rotation of helical solids-moving elements therein, a foraminous cylindrical lining over the inside of said shell formed of a multiplicity of similar individual lengths of narrow strip material confined in side by side abutment and each extending helically from one to the other end of said shell in a direction transverse to said helical elements.

3. In a centrifugal basket comprising a perforated cylindrical basket shell, a cylindrical filtration lining over the inside of said shell formed of a multiplicity of similar individual lengths of narrow strip material confined in side by side abutment and each extending helically from one to the other end of the shell at an angle of not more than about 4° to its axis.

4. In a centrifugal basket comprising a perforated cylindrical basket shell and adapted to be discharged by axial reciprocation of a solids-moving member therein, a cylindrical filtration lining over the inside of said shell formed of a multiplicity of similar individual lengths of narrow strip material confined in side by side abutment and each extending helically from one to the other end of the shell at an angle of not more than about 4° to its axis.

5. In a centrifugal basket comprising a perforated cylindrical basket shell, a cylindrical filtration lining over the inside of said shell formed of a multiplicity of individual lengths of narrow strip material confined in side by side abutment, each length extending in a circular arc constituting a fraction of the circumference of the lining and being secured at its ends directly to the shell.

6. In a centrifugal basket comprising a perforated cylindrical basket shell, a cylindrical filtration lining over the inside of said shell formed of a multiplicity of similar individual lengths of narrow strip material confined in side by side abutment, each length extending in a circular arc and being one of a group of many lengths covering the length of the shell, there being several such groups having their respective lengths aligned to encircle the shell, the ends of the lengths of each group being stepped in a helical line, and binding means securing the ends of the lengths of adjacent groups against the shell along each helical line.

7. In a centrifugal basket comprising a perforated annular basket shell, an internal filtration lining over the inside of said shell formed of lengths of narrow strip material held against the shell in side by side abutment as a substantially rigid yet resilient body and containing a myriad of filtration passages at intervals along and between butting sides of the strip lengths, each length of said material having similarly spaced shallow transverse grooves formed across one side thereof and correspondingly spaced transverse grooves formed across the back thereof adjacent said shell, each side groove being in alignment with a back groove and forming with a side of an adjacent strip length a very narrow filtration slit at the surface of the lining, the back grooves of said material forming channels transverse thereto between said lengths and said shell and aligned with said passages of the respective lengths to conduct liquid from said passages to the shell perforations.

8. In a centrifugal basket comprising a perforated annular basket shell, a foraminous lining formed of lengths of narrow strip material confined against the inside of said shell in side by side abutment, the strip material being of a quadrilateral cross section having even surfaces at the front and at one side, and being grooved transversely at regular intervals along the other side and grooved transversely at corresponding intervals along the back to form aligned liquid filtration passages across such other side and the back separated by aligned projections, the side projections of said lengths bearing against the even sides of adjacent lengths and the back projections of said lengths bearing against the basket shell.

9. A centrifugal basket lining material comprising a long narrow strip presenting an even front surface, an even surface along one side and surfaces grooved transversely entirely thereacross at intervals along the other side and the back of the strip, the respective side and back grooves being in alignment.

10. A centrifugal basket lining material comprising a long narrow strip presenting an even front surface, an even surface along one side, and surfaces grooved transversely entirely thereacross at intervals along the other side and the back of the strip, the respective side and back grooves being in alignment, all the grooves being relatively wide and shallow and the side grooves being tapered from regions of minimum depth at their intersections with the front surface to deeper regions at the back of the strip.

11. A centrifugal basket lining material comprising a long narrow strip presenting an even front surface, an even surface along one side, and surfaces grooved transversely entirely thereacross at intervals along the other side and the back of the strip, the respective side and back grooves being in alignment, all the grooves being relatively wide and shallow and the side grooves being tapered from regions of minimum depth at their intersections with the front surface to deeper regions at the back of the strip so as to form very narrow filtration slits by abutment of the grooved side of one length of the material against the even side of another length thereof, side walls of the individual side grooves being curved to form slits having rounded ends.

12. A centrifugal apparatus for separating liquids from granular solids including a centrifugal basket comprising a perforated annular basket shell of a strength to support the working load in the basket and carrying a foraminous filtration lining around its inner side and from end to end thereof, and a mechanical discharger having a scraper to work at said lining as the basket is rotated, the basket and said scraper being relatively movable so as to displace solids held on said lining in a given direction by the action of said scraper, wherein said lining is a substantially rigid yet resilient foraminous body formed of lengths of narrow elongated strip material having transverse dimensions of from one-eighth to one-fourth of one inch, said lengths being laid and held in side by side abutment and extending at an angle to the basket axis in the general direction of displacement of said solids by relative movement between the basket and said scraper, the lining containing a myriad of very narrow filtration slits located between and at regular intervals along the adjacent strip lengths and formed by regularly spaced shallow transverse grooves in one side of the strip material, said slits and said lengths of strip material presenting no obstructions transverse to the direction of the scraper action.

13. A centrifugal apparatus for separating liquids from granular solids including a centrifugal basket comprising a perforated annular basket shell, a filtration lining covering the inside of said shell, and a mechanical discharger having a scraper to work at said lining as the basket is rotated, the basket and said scraper being relatively movable so as to displace solids held on said lining in a given direction by the action of said scraper, wherein said lining is formed of lengths of elongated strip material of quadrilateral cross section having transverse dimensions of from one-eighth to one-fourth of an inch and laid and held in side by side abutment as a substantially rigid yet resilient annular body, said lengths extending at an angle to the basket axis and substantially in said direction of scraper action, so that the lining presents no obstructions transverse either to the scraper or to the path of said solids in said direction, each length of said material presenting an even front surface, an even side surface, a back surface, and a surface along the other side formed at regular intervals with shallow transverse grooves defining in the lining a myriad of minute filtration slits at intervals along and between butting sides of the adjacent strip lengths, said grooves being relatively wide and tapering from regions having a depth of approximately one one-hundredth of an inch at their intersections with the front surface to deeper regions at the back of the strip, and regularly spaced supports at the back of the assembled lengths holding the lining in spaced relation to the shell so that liquid passed through said slits can flow readily to the shell perforations.

14. A centrifugal basket lining material comprising a long narrow resilient metal strip of quadrilateral cross section having transverse dimensions of from one-eighth to one-fourth of an inch and presenting an even front surface, a even surface along one side, and a back surface and a surface along the other side each formed at regular intervals with shallow transverse grooves extending entirely thereacross, said grooves of said other side being relatively wide and tapering from regions having a depth of approximately one one-hundredth of an inch at their intersections with the front surface to deeper regions at the back of the strip.

References Cited in the file of this patent

UNITED STATES PATENTS

| 226,271 | Blaisdell | Apr. 6, 1880 |
|---|---|---|
| 1,025,485 | Selden | May 7, 1912 |
| 1,495,075 | Hoyle | May 20, 1924 |
| 1,593,051 | Woodworth | July 20, 1926 |
| 1,859,642 | Woodworth | May 24, 1932 |
| 1,991,286 | Mandahl | Feb. 12, 1935 |
| 2,000,490 | Mandahl | May 7, 1935 |
| 2,042,537 | Liddell | June 2, 1936 |
| 2,188,643 | Laderer | Jan. 30, 1940 |
| 2,226,463 | Gibbens | Dec. 24, 1940 |
| 2,279,235 | Hertrich | Apr. 7, 1942 |
| 2,321,207 | Howe | June 8, 1943 |

FOREIGN PATENTS

| 414,470 | Great Britain | Aug. 9, 1934 |
|---|---|---|
| 812,298 | France | May 4, 1937 |